United States Patent
Shimazoe et al.

(10) Patent No.: US 10,234,814 B2
(45) Date of Patent: Mar. 19, 2019

(54) POWER SUPPLY APPARATUS AND IMAGE FORMING APPARATUS

(71) Applicant: KONICA MINOLTA, INC., Chiyoda-ku, Tokyo (JP)

(72) Inventors: Makoto Shimazoe, Toyokawa (JP); Masayuki Watanabe, Fuchu (JP); Yuhei Tatsumoto, Toyokawa (JP); Akihiro Hayashi, Okazaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/890,991

(22) Filed: Feb. 7, 2018

(65) Prior Publication Data

US 2018/0275592 A1 Sep. 27, 2018

(30) Foreign Application Priority Data

Mar. 23, 2017 (JP) .................................. 2017-057042

(51) Int. Cl.
G03G 15/00 (2006.01)
H02M 7/06 (2006.01)
H01F 38/00 (2006.01)
H02M 1/00 (2006.01)

(52) U.S. Cl.
CPC .............. *G03G 15/80* (2013.01); *H02M 7/06* (2013.01); *H01F 38/00* (2013.01); *H02M 2001/009* (2013.01)

(58) Field of Classification Search
CPC .............. G03G 15/0266; G03G 15/80; G03G 15/5041; G03G 15/5058; G03G 15/5012; G03G 15/5004

USPC ................................... 399/50, 55, 88, 89, 90
See application file for complete search history.

(56) References Cited

U.S. PATENT DOCUMENTS

| | | | |
|---|---|---|---|
| 9,209,769 B2 | 12/2015 | Kawano | |
| 2002/0131788 A1* | 9/2002 | Nakaya | G03G 15/80 399/88 |
| 2005/0111890 A1* | 5/2005 | Hasenauer | G03G 15/0283 399/315 |
| 2018/0196386 A1* | 7/2018 | Shiraki | G03G 15/1675 |

FOREIGN PATENT DOCUMENTS

JP 2014204170 A 10/2014

* cited by examiner

*Primary Examiner* — Nguyen Tran
(74) *Attorney, Agent, or Firm* — Holtz, Holtz & Volek PC

(57) ABSTRACT

A power supply apparatus includes: a first primary winding; a first AC voltage outputter connected to one side of the first primary winding so as to output a first AC voltage; a second AC voltage outputter connected to the other side of the first primary winding and capable of outputting a second AC voltage with an inverted phase of the first AC voltage; a first secondary winding that generates a third AC voltage by mutual induction of the first primary winding to which the first AC voltage and the second AC voltage are applied; a second primary winding having one side receiving an input of the second AC voltage and the other side connected to a fixed voltage; and a second secondary winding that generates a fourth AC voltage by mutual induction of the second primary winding to which the second AC voltage is applied.

6 Claims, 11 Drawing Sheets

FIG. 5

| | | | CHARGING AC VOLTAGE | | | | | | | | | | |
|---|---|---|---|---|---|---|---|---|---|---|---|---|---|
| | | | OFF STATE 0V | | | LOWER LIMIT VALUE 600V | | | CENTER VALUE 1500V | | | UPPER LIMIT VALUE 2400V | | |
| | | | SA AMPLITUDE | SB AMPLITUDE | PHASE DIFFERENCE | SA AMPLITUDE | SB AMPLITUDE | PHASE DIFFERENCE | SA AMPLITUDE | SB AMPLITUDE | PHASE DIFFERENCE | SA AMPLITUDE | SB AMPLITUDE | PHASE DIFFERENCE |
| CHARGING DC VOLTAGE | OFF STATE | 0V | 0 | 0 | 0 | NO MODE | | | | | | | | |
| | LOWER LIMIT VALUE | -400V | 8 | 8 | 0 | 2 | 8 | 0 | 7 | 8 | 180 | 16 | 8 | 180 |
| | CENTER VALUE | -600V | 12 | 12 | 0 | 6 | 12 | 0 | 3 | 12 | 180 | 12 | 12 | 180 |
| | UPPER LIMIT VALUE | -800V | 16 | 16 | 0 | 10 | 16 | 0 | 1 | 16 | 0 | 8 | 16 | 180 |

BOOSTING RATIO AT TRANSFORMER 5: 100 TIMES
BOOSTING RATIO AT TRANSFORMER 6 AFTER RECTIFIER CIRCUIT: 50 TIMES

FIG. 8

| | | PRIMARY TRANSFER VOLTAGE | | | | | | | | | | | | | | | | | |
|---|---|---|---|---|---|---|---|---|---|---|---|---|---|---|---|---|---|---|---|
| CHARGING DC VOLTAGE | | OFF STATE 0V | | | | | CHARGING AC OFF MODE 500V to 1000V | | | | | LOWER LIMIT VALUE 750V | | | | | UPPER LIMIT VALUE 800V | | | | |
| | | | | CHARGING AC VOLTAGE | | | | | CHARGING AC VOLTAGE | | | | | CHARGING AC VOLTAGE (500V TO 2500V) | | | | | CHARGING AC VOLTAGE (600V TO 2600V) | | |
| | | SA AMPLITUDE | SB AMPLITUDE | PHASE DIFFERENCE 0° | PHASE DIFFERENCE 90° | PHASE DIFFERENCE 180° | SA AMPLITUDE | SB AMPLITUDE | PHASE DIFFERENCE 0° | PHASE DIFFERENCE 90° | PHASE DIFFERENCE 180° | SA AMPLITUDE | SB AMPLITUDE | PHASE DIFFERENCE 0° | PHASE DIFFERENCE 90° | PHASE DIFFERENCE 180° | SA AMPLITUDE | SB AMPLITUDE | PHASE DIFFERENCE 0° | PHASE DIFFERENCE 90° | PHASE DIFFERENCE 180° |
| OFF STATE | 0V | 0V | 0 | 0 | 0 | 0 | NO MODE | | | | | NO MODE | | | | | NO MODE | | | | |
| LOWER LIMIT VALUE | −400V | | | | | | 10 | 10 | 0 | NO MODE | | 15 | 10 | 500 | 1803 | 2500 | 16 | 10 | 600 | 1887 | 2600 |
| CENTER VALUE | −600V | | | | | | 15 | 15 | 0 | NO MODE | | 15 | 15 | 0 | 2121 | 3000 | 16 | 15 | 100 | 2193 | 3100 |
| UPPER LIMIT VALUE | −800V | | | | | | 20 | 20 | 0 | NO MODE | | 15 | 20 | 500 | 2500 | 3500 | 16 | 20 | 400 | 2561 | 3600 |

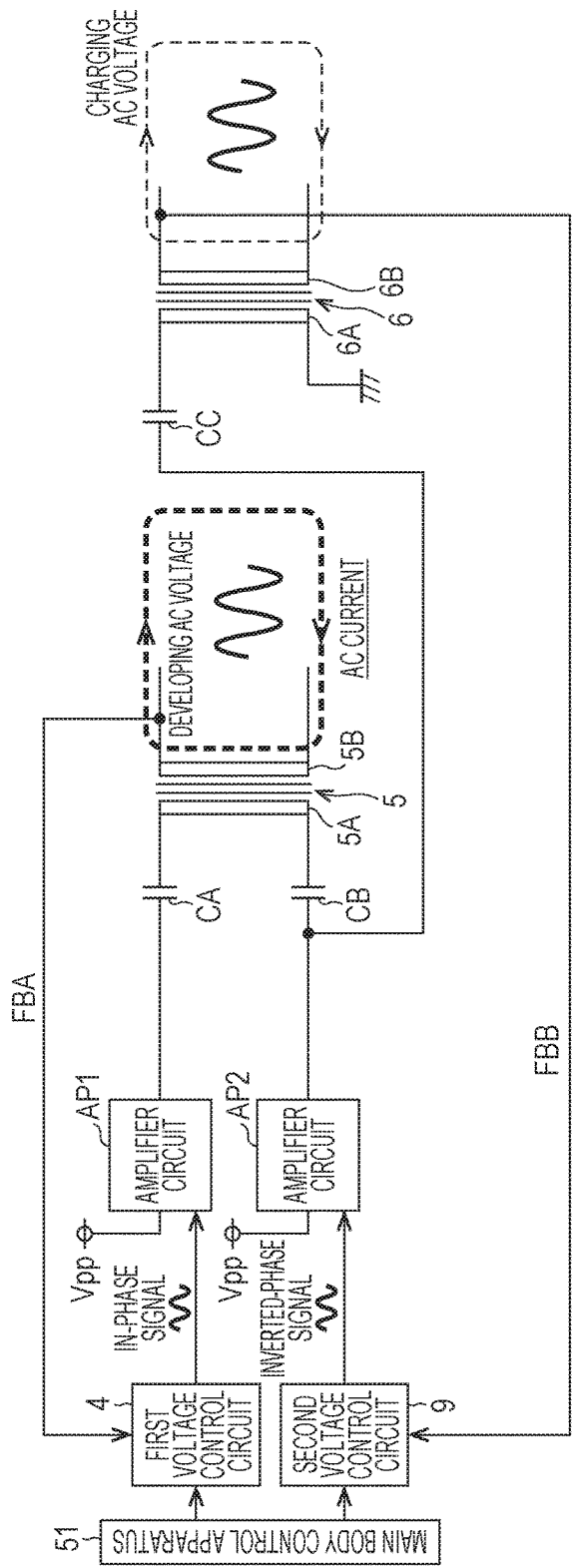

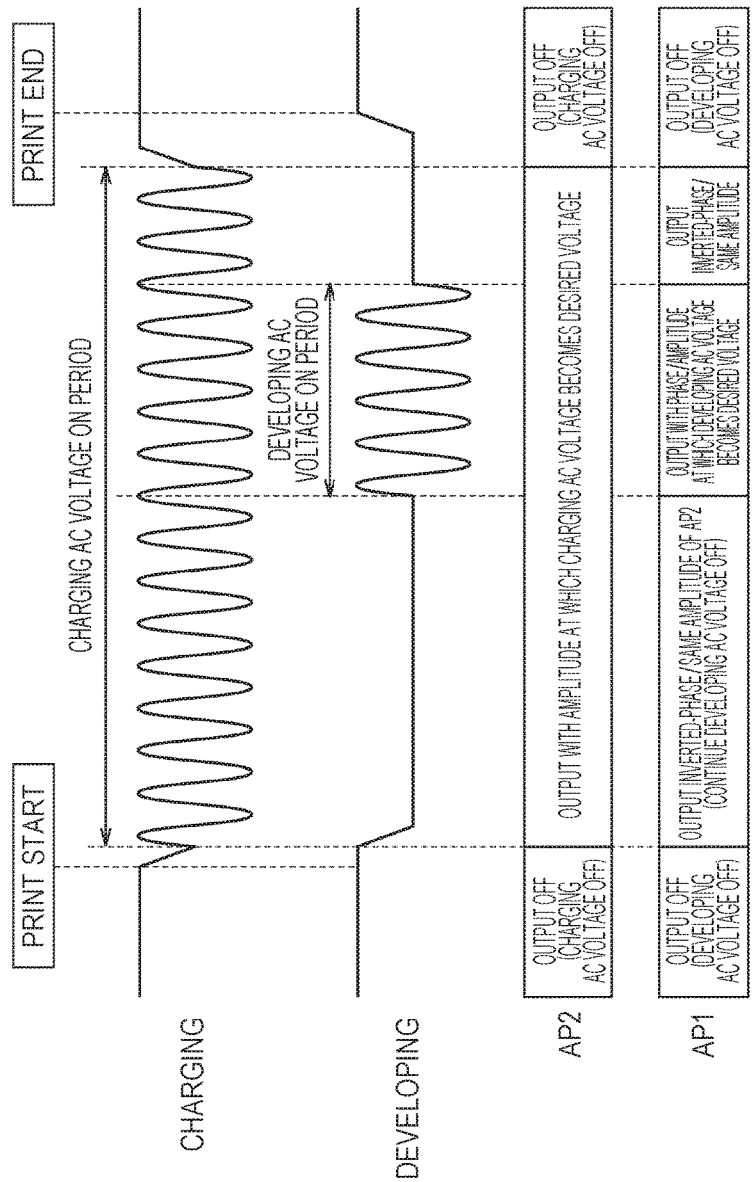

POWER SUPPLY APPARATUS AND IMAGE FORMING APPARATUS

The entire disclosure of Japanese patent Application No. 2017-057042, filed on Mar. 23, 2017, is incorporated herein by reference in its entirety.

BACKGROUND

Technological Field

The present disclosure relates to a power supply apparatus and in particular to a power supply apparatus in an image forming apparatus.

Description of the Related Art

Methods of charging a photoreceptor used in an image forming apparatus include a scorotron system using corona discharge, which generates ozone a lot.

Therefore, a method using a charging roller system with less ozone generation has been a mainstream. The charging roller system, however, needs to apply charge-discharge of electrified charges for the specified number or more times per unit area of the photoreceptor to the photoreceptor in order to equalize a surface potential of a rotating photoreceptor with a desired potential.

Therefore, the higher the speed of the image firming apparatus, the larger the number of times of this charge-discharge to be performed.

Usually, an image forming apparatus includes a high-voltage transformer capable of outputting a high AC voltage needed to perform this charge-discharge.

In addition, the AC frequency needs to be increased in order to increase the number of times of charge-discharge.

While increasing the AC frequency increases the discharge current used for charge-discharge, this also creases a dielectric current flowing into the charging roller, the photoreceptor, and an adjacent dielectric material in proportion to the frequency.

This would cause an AC current as a sum of the discharge current and the dielectric current to flow in via a high-voltage transformer. In this case, the winding number ratio in the transformer increases to 100 or more in order to boost the sine wave with normal amplitude of about 20 V to 100 times or more, requiring 1000 turns or more winding numbers.

In winding this number of turns around a bobbin of the high-voltage transformer, urethane enamel wires (UEW) with wire diameter on the order of microns would be used. In this case, their thinness and a large number of turns would increase a resistance value, leading to a possibility that the maximum temperature range of the UEW is exceeded due to the heat generated by the AC current.

In order to suppress this heat generation, there is a proposed system referred to as a bridge transformerless (BTL) system in which a sine wave with 180° shifted phase is input in a primary side winding of the high-voltage transformer to double the input voltage to the primary side so as to half the number of turns (refer to JP 2014-204170 A).

On the other hand, since the BTL system uses two sine waves and therefore needs two amplifiers for forming the sine waves, the circuit scale might he large in order to generate a plurality of types of high voltages.

SUMMARY

The present disclosure has been made to solve the above problems, and an object thereof is to provide a power supply apparatus and an image forming apparatus capable of generating a plurality of types of high voltages with a simple configuration.

To achieve the abovementioned object, according to an aspect of the present invention, a power supply apparatus reflecting one aspect of the present invention comprises: a first primary winding; a first AC voltage outputter connected to one side of the first primary winding so as to output a first AC voltage; a second AC voltage outputter connected to the other side of the first primary winding and capable of outputting a second AC voltage with an inverted phase of the first AC voltage; a first secondary winding that generates a third AC voltage by mutual induction of the first primary winding to which the first AC voltage and the second AC voltage are applied; a second primary winding having one side receiving an input of the second AC voltage and the other side connected to a fixed voltage; and a second secondary winding that generates a fourth AC voltage by mutual induction of the second primary winding to which the second AC voltage is applied.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram illustrating an exemplary voltage table used for voltage generation in the power supply apparatus according to the first example of the embodiment;

FIG. 8 is a diagram illustrating an exemplary voltage table used for voltage generation in the power supply apparatus according to the second example of the embodiment;

FIG. 9 is a diagram illustrating a power supply apparatus according to a third example of the present embodiment;

FIG. 10 is a diagram illustrating voltage generation of the power supply apparatus according to the third example of the present embodiment.

DETAILED DESCRIPTION OF EMBODIMENTS

Figure 1:
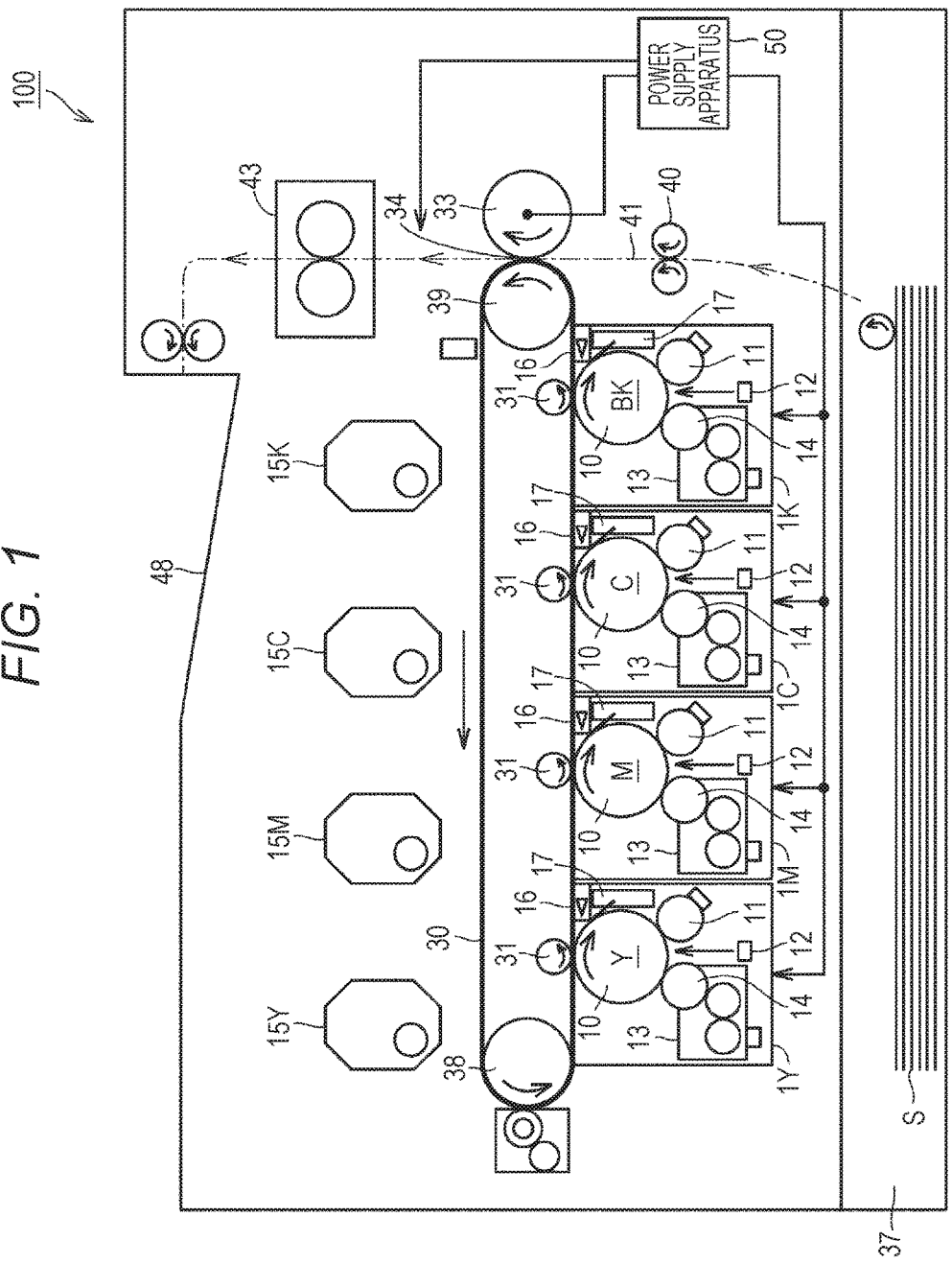
FIG. 1 is a diagram illustrating an exemplary internal structure of an image forming apparatus according an embodiment.

Hereinafter, one or more embodiments of the present invention will be described with reference to the drawings. However, the scope of the invention is not limited to the disclosed embodiments. In the following description, the same components and constituent elements are denoted by the same reference numerals. Their names and functions are also the same. Therefore, detailed description of these will not be repeated. Note that each of embodiments and each of modifications described below may be selectively combined as appropriate.

The following embodiments describe a case where a sheet feeder is mounted on an image forming apparatus. Examples of the image forming apparatus include an MFP, a printer, a copying machine, and a facsimile. The sheet feeder may be mounted on a post-processing apparatus having a post-processing section to perform predetermined processing on a sheet fed by an image reader or a sheet feeder, instead of on the image forming apparatus.

[Internal Structure of Image Forming Apparatus]

FIG. 1 is a diagram illustrating an exemplary internal structure of an image forming apparatus 100 according to an embodiment.

The image forming apparatus 100 equipped with a power supply apparatus 50 will be described with reference to FIG. 1.

FIG. 1 illustrates the image forming apparatus 100 as a color printer. Hereinafter, the image forming apparatus 100 as a color printer will be described, although the image forming apparatus 100 is not limited to the color printer. For example, the image forming apparatus 100 may be a multi-functional peripheral (MFP).

The image forming apparatus 100 has a monochrome printing mode of forming an image using black alone and a color printing mode of forming an image using yellow, magenta, cyan, and black.

The image forming apparatus 100 includes image forming units 1Y, 1 M, 1C, and 1K, an intermediate transfer belt 30, a primary transfer roller 31, a secondary transfer roller 33, a separator 34, a cassette 37, a driven roller 38, a driving roller 39, a timing roller 40, a fixing apparatus 43, and the power supply apparatus 50.

The image forming units 1Y, 1M, 1C, and 1 K are arranged in this order along the intermediate transfer belt 30. The image forming unit 1Y receives toner supplied from the toner bottle 15Y and forms a yellow (Y) toner image. The image forming unit 1M receives toner supplied from the toner bottle 15M and forms a magenta (M) toner image. The image forming unit 1C receives toner supplied from the toner bottle 15C and forms a cyan (C) toner image. The image forming unit 1K receives a toner supplied from the toner bottle 15K and forms a black (BK) toner image.

The image forming units 1Y, 1M, 1C, and 1K are arranged in order of the rotation direction of the intermediate transfer belt 30 along the intermediate transfer belt 30. Each of the image forming units 1Y, 1M, 1C, and 1K includes a photoreceptor 10, a charging apparatus 11, an exposure apparatus 12, a developing apparatus 13, a destaticizer 16, and a cleaning apparatus 17.

The charging apparatus 11 uniformly charges a surface of the photoreceptor 10. The exposure apparatus 12 emits a laser beam onto the photoreceptor 10 in accordance with a control signal from a main body control apparatus 51 to be described below and exposes the surface of the photoreceptor 10 in accordance with an input image pattern. With this procedure, an electrostatic latent image corresponding to an input image is formed on the photoreceptor 10.

The developing apparatus 13 applies a developing bias to the developing roller 14 while rotating the developing roller 14, and allows the toner to adhere to the surface of the developing roller 14. This allows the toner to be transferred from the developing roller 14 to the photoreceptor 10, and a toner image corresponding to the electrostatic latent image is developed on the surface of the photoreceptor 10.

The photoreceptor 10 and the intermediate transfer belt 30 are in contact with each other at a portion in which the primary transfer roller 31 is provided. The primary transfer roller 31 is rotatable. With application of a transfer voltage having a polarity opposite to the polarity of the toner image to the primary transfer roller 31, the toner image is transferred from the photoreceptor 10 to the intermediate transfer belt 30.

In the color printing mode, toner images of yellow (Y), magenta (M), cyan (C), and black (BK) are sequentially superposed in this order and transferred to the intermediate transfer belt 30 from the photoreceptor 10. With this procedure, a colored toner image is formed on the intermediate transfer belt 30. In the monochrome printing mode, a toner image of black (BK) is transferred from the photoreceptor 10 to the intermediate transfer belt 30.

The intermediate transfer belt 30 is stretched by a driven roller 38 and a driving roller 39. The driving roller 39 is rotationally driven by a motor (not illustrated), for example. The intermediate transfer belt 30 and the driven roller 38 rotate in conjunction with the driving roller 39. With this configuration, the toner image on the intermediate transfer belt 30 is conveyed to the secondary transfer roller 33.

The destaticizer 16 destaticizes the charged toner adhering to the surface of the photoreceptor 10. Destaticizing the charged toner would facilitate toner recovery by the cleaning apparatus 17 described below.

The cleaning apparatus 17 is in pressure contact with the photoreceptor 10. The cleaning apparatus 17 collects the toner remaining on the surface of the photoreceptor 10 after transfer of the toner image.

A sheet S is set in the cassette 37. The sheet S is transferred one by one from the cassette 37 to the secondary transfer roller 33 along the conveyance path 41 by the timing roller 40. The secondary transfer roller 33 applies a transfer voltage having a polarity opposite to the polarity of the toner image to the sheet S being conveyed. This operation attracts the toner image from the intermediate transfer belt 30 to the secondary transfer roller 33, allowing the toner image on the intermediate transfer belt 30 to be transferred on the sheet S. The timing of conveying the sheet S to the secondary transfer roller 33 is adjusted by the timing roller 40 in accordance with the position of the toner image on the intermediate transfer belt 30. With the timing roller 40, the toner image on the intermediate transfer belt 30 is transferred to an appropriate position on the sheet S.

The separator 34 is used for separating the sheet S from the intermediate transfer belt 30. Specifically, the separator 34 applies a voltage having a polarity opposite to the polarity of the sheet S to attract the sheet S to the separator 34 side so as not to be sucked to the intermediate transfer belt 30, and conveys the sheet S to the fixing apparatus 43.

The fixing apparatus 43 pressurizes and heats the sheet S passing therethrough. This operation allows a toner image formed on the sheet S to be fixed on the sheet S. Thereafter, the sheet S is discharged onto the tray 48.

For example, the power supply apparatus 50 supplies voltages of different levels to individual apparatuses in the image forming apparatus 100. Details attic power supply apparatus 50 will be described below.

[Hardware Configuration of Image Forming Apparatus]

Figure 2:
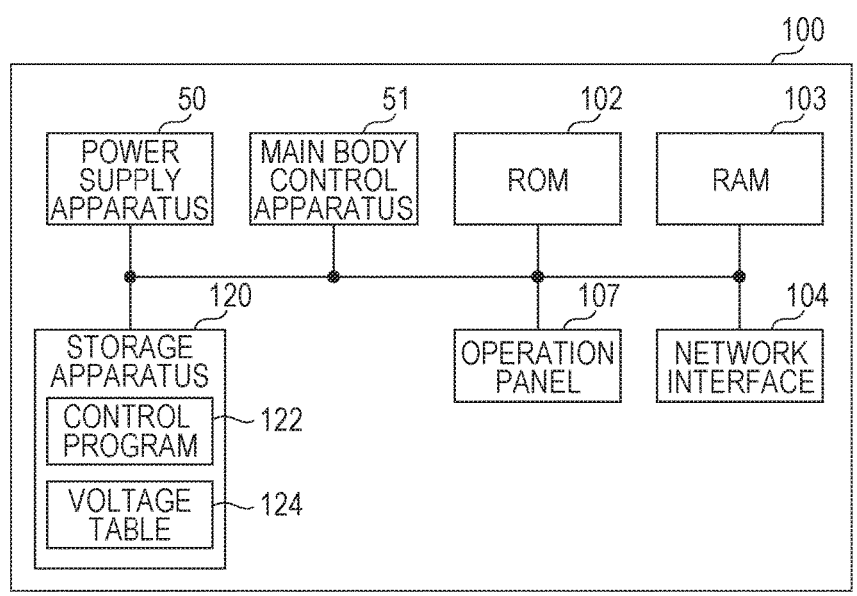
FIG. 2 is a block diagram illustrating a main hardware configuration of the image forming apparatus.

An exemplary hardware configuration of the image forming apparatus 100 will be described with reference to FIG. 2. FIG. 2 is a block diagram illustrating the main hardware configuration of the image forming apparatus 100.

As illustrated in FIG. 2, the image forming apparatus 100 includes the power supply apparatus 50, the main body control apparatus 51, a read only memory (ROM) 102, a random access memory (RAM) 103, a network interface 104, an operation panel 107, and a storage apparatus 120.

The main body control apparatus 51 includes at least one integrated circuit. The integrated circuit includes at least one CPU, at least one DSP, at least one application specific integrated circuit (ASIC), at least one field programmable gate array (FPGA), or a combination of the above circuits.

The main body control apparatus 51 controls both the power supply apparatus 50 and the image forming apparatus 100. That is, the main body control apparatus 51 is shared by the power supply apparatus 50 and the image forming apparatus 100. The main body control apparatus 51 may be configured separately from the power supply apparatus 50 or may be configured integrally with the power supply apparatus 50. When the main body control apparatus 51 is configured separately from the power supply apparatus 50, the configuration of the power supply apparatus 50 becomes simple.

The main body control apparatus 51 selects either the monochrome printing mode or the color printing mode in accordance with information input to the operation panel 107 and controls the power supply apparatus 50 and the image forming apparatus 100 in accordance with the selected mode. The main body control apparatus 51 outputs a selected mode identification signal indicating the selected mode to the power supply apparatus 50.

The main body control apparatus 51 executes a control program 122 for the power supply apparatus 50 and the image forming apparatus 100 to control operation of the image forming apparatus 100.

The main body control apparatus 51 loads the control program 122 from the storage apparatus 120 onto the ROM 102 on the basis of reception of an execution command of the control program 122. The RAM 103 functions as a working memory and temporarily stores various data necessary for executing the control program 122.

The main body control apparatus 51 sets a target voltage value for the power supply apparatus 50 on the basis of the execution command of the control program 122. Specifically, the main body control apparatus 51 sets the target voltage value on the basis of the data of the voltage table 124.

An antenna (not illustrated) or the like are connected to the network interface 1.04. The image forming apparatus 100 exchanges data with an external communication device via an antenna. The external communication device includes a mobile communication terminal such as a smartphone, a server, for example. The image forming apparatus 100 may be configured to be able to download the control program 122 from the server via the antenna.

The operation panel 107 includes a display and a touch panel. The display and the touch panel are overlapped with each other. The operation panel 107 receives printing operation, scanning operation on the image forming apparatus 100, for example.

The storage apparatus 120 is a storage medium such as a hard disk and an external storage apparatus, for example. The storage apparatus 120 stores the control program 122, the voltage table 124 of the image forming apparatus 100, or the like. The storage location of the control program 122 is not limited to the storage apparatus 120, and the control program 122 may be stored in a storage region of the power supply apparatus 50, a storage region (for example, a cache) of the main body control apparatus 51, the ROM 102, the RAM 103, an external device (for example, a server), or the like.

The control program 122 may be provided as a portion of a certain program, rather than a single program. In this case, control processing according to the present embodiment is implemented in cooperation with the certain program. Even programs not including some modules are within the scope of the control program 122 according to the present embodiment. Furthermore, a portion or all of the functions provided by the control program 122 may be implemented by dedicated hardware. Furthermore, the image forming apparatus 100 may be configured in a form of a cloud service in which at least one server executes a portion of the processing of the control program 122.

[Power Supply Apparatus 50]

As described above, the power supply apparatus 50 applies voltages of different magnitudes to the individual apparatuses in the image forming apparatus 100. As an example, the power supply apparatus 50 supplies a charging voltage applied to the charging apparatus 11, a developing voltage applied to the developing roller 14, a primary transfer voltage applied to the primary transfer roller 31, a secondary transfer voltage applied to the secondary transfer roller 33, a separation voltage applied to the separator 34, and a destaticizing voltage applied to the destaticizer 16.

In the charging voltage and the developing voltage, a DC voltage is superimposed on the AC voltage in order to enhance image quality. The primary transfer voltage is a DC voltage of negative polarity. The secondary transfer voltage is a DC voltage of positive polarity. Accordingly, cleaning of the primary transfer roller 31 needs a DC voltage of positive polarity while cleaning of the secondary transfer roller 33 needs a DC voltage of negative polarity.

In this manner, the power supply apparatus 50 outputs many different types of voltages, and thus, needs a considerable number of high-voltage transformers.

The charging apparatus 11, the developing roller 14, the primary transfer roller 31, and the destaticizer 16 are provided in each of the image forming units 1Y, 1M, 1C, and 1K. Accordingly, the power supply apparatus 50 outputs four types of voltages corresponding to four colors of Y, M, C, and K for each of the charging voltage, the developing voltage, the primary transfer voltage and the destaticizing voltage. In a case of providing high-voltage transformers separately to output the four types of voltages corresponding to individual colors, the cost of the power supply apparatus would increase. To cope with this, the power supply apparatus 50 includes one high-voltage transformer to be shared by each of the charging voltage, the developing voltage, the primary transfer voltage, and the destaticizing voltage, and outputs four types of voltages corresponding to individual colors from the shared high-voltage transformer.

Hereinafter, the power supply apparatus 50 to supply the charging voltage to each of the charging apparatuses 11 of the image forming units 1Y, 1M, 1C, and 1K will be described. Due to the similar configuration to the power supply apparatus 50 to supply the primary transfer voltage, the development voltage, and the destaticizing voltage, description therefor will he omitted.

(1. First Example of Power Supply Apparatus)

Figure 3:
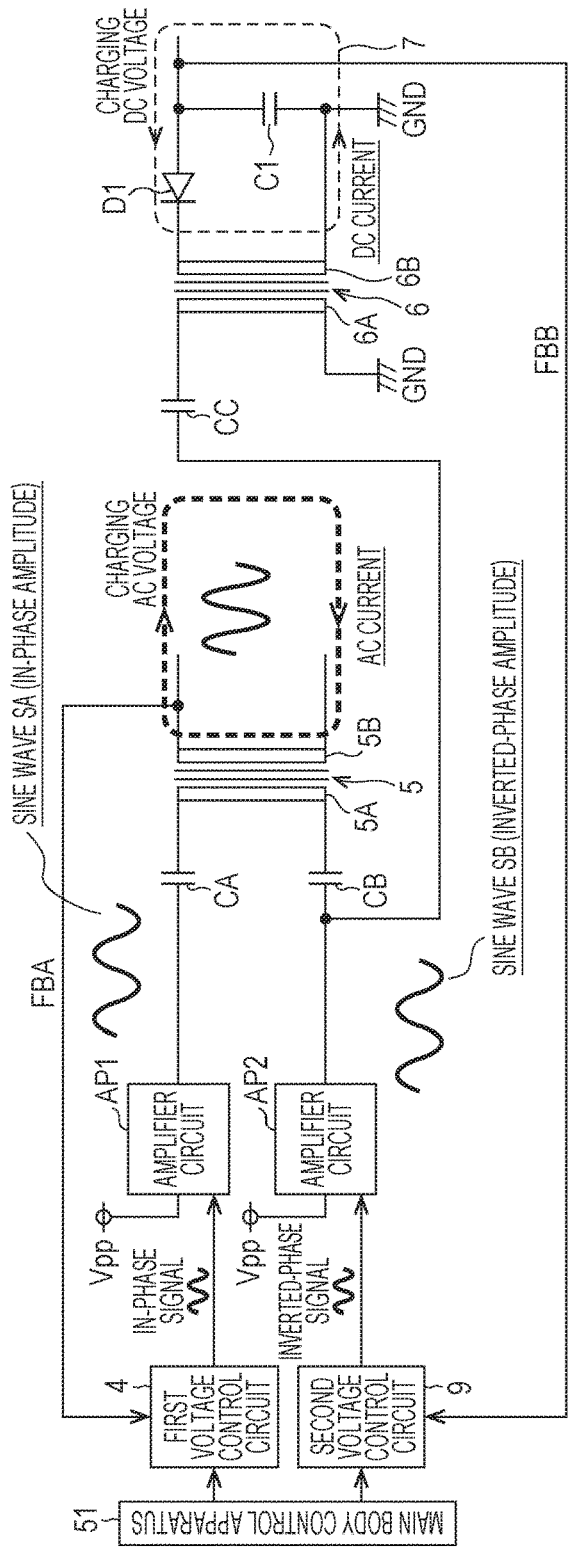
FIG. 3 is a diagram illustrating a power supply apparatus according to a first example of the embodiment.

FIG. 3 is a diagram illustrating a power supply apparatus 50A according to a first example of the embodiment.

The power supply apparatus 50A includes a first voltage control circuit 4, a second voltage control circuit 9, amplifier circuits AP1 and AP2, capacitors CA, CB and CC, high-voltage transformers 5 and 6, and a rectifier circuit 7. The main body control apparatus 51 controls the power supply apparatus 50A. Specifically, the main body control apparatus 51 instructs the first voltage control circuit 4 and the second voltage control circuit 9.

The high-voltage transformer 5 includes a primary winding 5A and a secondary winding 5B. The high-voltage transformer 6 includes a primary winding 6A and a secondary winding 6B.

The rectifier circuit 7 includes a diode D1 and a capacitor C1.

The first voltage control circuit 4 and the second voltage control circuit 9 operate in accordance with an instruction from the main body control apparatus 51.

The first voltage control circuit 4 outputs an in-phase signal according to an instruction from the main body control apparatus 51.

The amplifier circuit AP1 amplifies the in-phase signal from the first voltage control circuit 4 to output a sine wave SA.

The amplifier circuit AP2 amplifies an inverted-phase signal from the second voltage control circuit 9 to output a sine wave SB.

The capacitor CA has one end side connected to an output of the amplifier circuit AP1, while the other end side connected to one end side of the primary winding 5A of the high-voltage transformer 5.

The capacitor CB has one end side connected to an output of the amplifier circuit AP2, while the other end connected to the other end side of the primary winding 5A of the high-voltage transformer 5.

Application of an AC current to the primary winding 5A generates an AC voltage in the secondary winding 5B by mutual induction. The magnitude of the AC voltage generated in the secondary winding 5B is proportional to the number of turns of the coil.

The AC voltage generated in the secondary winding 5B is supplied to the charging apparatus 11 as a charging AC voltage.

The charging AC voltage is input as a feedback voltage FBA to the first voltage control circuit 4. The first voltage control circuit 4 adjusts the voltage in accordance with the feedback voltage FBA.

The present example includes the capacitor CC connected in parallel to the capacitor CB.

The capacitor CC has one end side connected to an output of the amplifier circuit AP2 and the other end side connected to one end side of the primary winding 6A of the high-voltage transformer 6. The other end side of the primary winding 6A of the high-voltage transformer 6 is connected to a ground voltage GND.

One end side of the secondary winding 6B of the high-voltage transformer 6 is connected to the diode D1 on a cathode side. An anode side of the diode D1 is connected to the other end side of the secondary winding 6B of the high-voltage transformer 6. The other end side of the secondary winding 6B is connected to the ground voltage GND. With this configuration, application of an AC current to the primary winding 6A generates an AC voltage in the secondary winding 6B by mutual induction. The AC voltage generated in the secondary winding 6B is supplied to the charging apparatus 11 as a charging DC voltage by the rectifier circuit 7. Although not illustrated in the present example, the charging AC voltage is superimposed on the charging DC voltage and the mutually superimposed voltage is supplied to the charging apparatus 11.

The charging DC voltage is input as a feedback voltage FBB to the second voltage control circuit 9. The second voltage control circuit 9 adjusts the voltage in accordance with the feedback voltage FBB.

While the power supply apparatus 50A based on the BTL system of the present example needs a control circuit and a driving element for each of the amplifier circuit AP1 that outputs the in-phase signal and the amplifier circuit AP2 that outputs the inverted-phase signal, the power supply apparatus 50A outputs the charging DC voltage using the amplifier circuit AP2 used in common for generating the charging AC voltage and outputting the inverted-phase signal.

Figure 4:
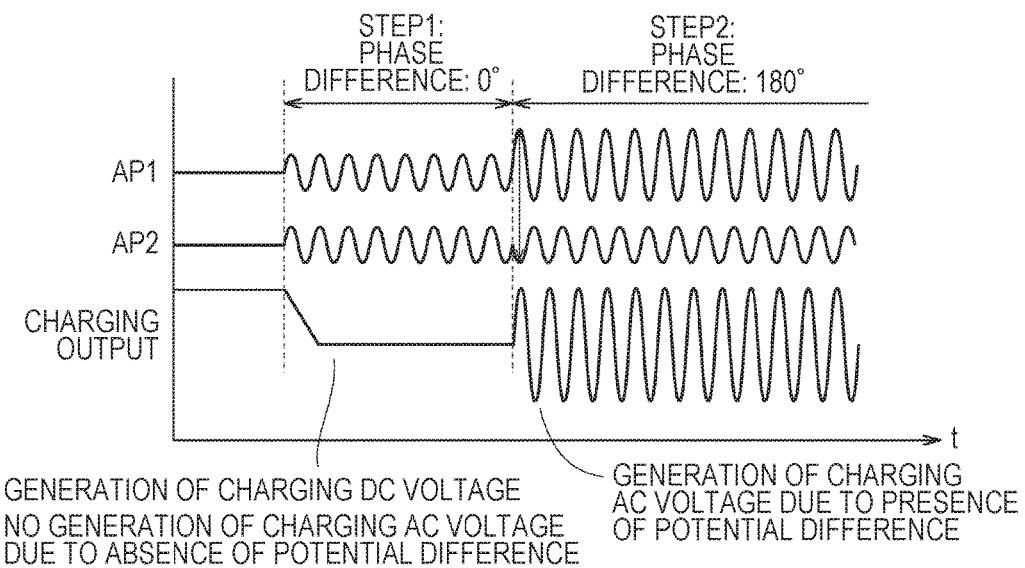
FIG. 4 is a diagram illustrating voltage generation in the power supply apparatus according to the first example of the embodiment.

FIG. 4 is a diagram illustrating voltage generation in the power supply apparatus 50A according to the first example of the embodiment.

As illustrated in FIG. 4, when the sine wave SB of an inverted-phase signal is applied from the amplifier circuit AP2, an AC current is supplied to the primary windings 5A and 6A sides of the high-voltage transformer 5 and the high-voltage transformer 6, respectively.

When the AC current is supplied to the primary winding 6A of the high-voltage transformer 6, a high voltage corresponding to the boosting ratio determined by the amplitude of the sine wave SB and by the winding ratio of the primary winding 6A and the secondary winding 6B of the high-voltage transformer 6 is generated in the secondary winding 6B of the high-voltage transformer 6 by mutual induction. The generated high voltage is rectified by the rectifier circuit 7, leading to an output of a desired charging DC voltage. In the present example, the charging DC voltage is set to a negative voltage.

In a case where the charging AC voltage is not output in the present example, the amplifier circuit AP1 applies a sine wave SA having the same phase and the same amplitude as a sine wave SB in a case where the sine wave SB from the amplifier circuit AP2 is applied to the primary winding 5A of the high-voltage transformer 5. This results in no generation of a potential difference in the primary winding 5A of the high-voltage transformer 5, leading to no generation of the charging AC voltage.

In another case where the charging AC voltage is output, the sine wave SA is applied from the amplifier circuit AP1 to one end side of the primary winding 5A of the high-voltage transformer 5. In addition, the sine wave SB is applied from the amplifier circuit AP2 to the other end side of the primary winding 5A of the high-voltage transformer 5. Application of the sine wave SB shifted in phase by 180° with respect to the sine wave SA generates a potential difference in the primary winding 5A of the high-voltage transformer 5, leading to generation of a high voltage according to the boosting ratio determined by the winding ratio between the primary side and the secondary side of the high-voltage transformer 5. Note that it is sufficient to have a potential difference and thus even in a case where the sine waves SA and SB have the same phase, adjustment of amplitude leads to generation of a high voltage in accordance with the boosting ratio determined by the winding ratio between the primary side and the secondary side of the high-voltage transformer 5 in accordance with a potential based on a difference in the amplitudes.

Moreover, the output level of the high voltage is adjustable by varying the amplitude of the sine wave SA of the amplifier circuit AP1.

As charging sequence processing, the charging DC voltage is output, and thereafter the charging AC voltage is output.

FIG. 5 is a diagram illustrating an exemplary voltage table used for voltage generation in the power supply apparatus 50A according to the first example of the embodiment.

As illustrated in FIG. 5, it is possible to variably set the charging DC voltage and the charging AC voltage by adjusting the voltages of the sine waves SA and SB and the phase difference between the sine waves SA and SB.

More specifically, when the charging AC voltage is turned off, the sine waves SA and SB are set to have the same phase and the same amplitude.

In contrast, the charging DC voltage is set to a value corresponding to the amplitude of the sine wave SB and the boosting ratio of the high-voltage transformer 6. In the present example, as an example, the boosting ratio is set to 50 times.

Therefore, the charging DC voltage is set to −400 V, −600 V, and −800 V in accordance with the amplitude of the sine wave SB of 8 V, 12 V, and 16 V.

Meanwhile, the charging AC voltage can be set by adjusting the amplitude and the phase of the sine wave SA with respect to the sine wave SB.

The charging AC voltage is set to a value corresponding to the amplitude and the phase difference of the sine waves SA and SB, and the boosting ratio of the high-voltage transformer 5. In the present example, the boosting ratio is set to 100 times.

For example, when the amplitude of the sine wave SA is 2 V, 6 V, 10 V, the amplitude of the sine wave SB is set to 8 V, 12 V, 16 V. Sine waves SA and SB are set to the same phase.

Since the potential difference between the sine waves SA and SB is set to 6 V, the charging AC voltage is set to 600 V in accordance with the boosting ratio (100 times).

When the amplitude of the sine wave SA is 7 V and 3 V, the amplitudes of the sine wave SB is set to 8 V and 12 V. The phase difference between the sine wave SA and the sine wave SB is set to 180°.

Since the potential difference between the sine waves SA and SB is set to 15 V, the charging AC voltage is set to 1500 V in accordance with the boosting ratio (100 times).

When the amplitude of the sine wave SA is 1 V, the amplitude of the sine wave SB is set to 16 V. The sine wave SA and the sine wave SB are set to the same phase.

Since the potential difference between the sine waves SA and SB is set to 15 V, the charging AC voltage is set to 1500 V in accordance with the boosting ratio (100 times).

When the amplitude attic sine wave SA is 16 V, 12 V, and 8 V, the amplitude of the sine wave SB is set to 8 V, 12 V, and 16 V. The phase difference between the sine wave SA and the sine wave SB is set to 180°.

Since the potential difference between the sine waves SA and SB is set to 24 V, the charging AC voltage is set to 2400 V in accordance with the boosting ratio (100 times).

The power supply apparatus 50A outputs the charging DC voltage using the amplifier circuit AP2 used in common for generating the charging AC voltage and outputting the inverted-phase signal, making it possible to generate a plurality of types of high voltages with a simple configuration.

(2. Second Example of Power Supply Apparatus)

Figure 6:
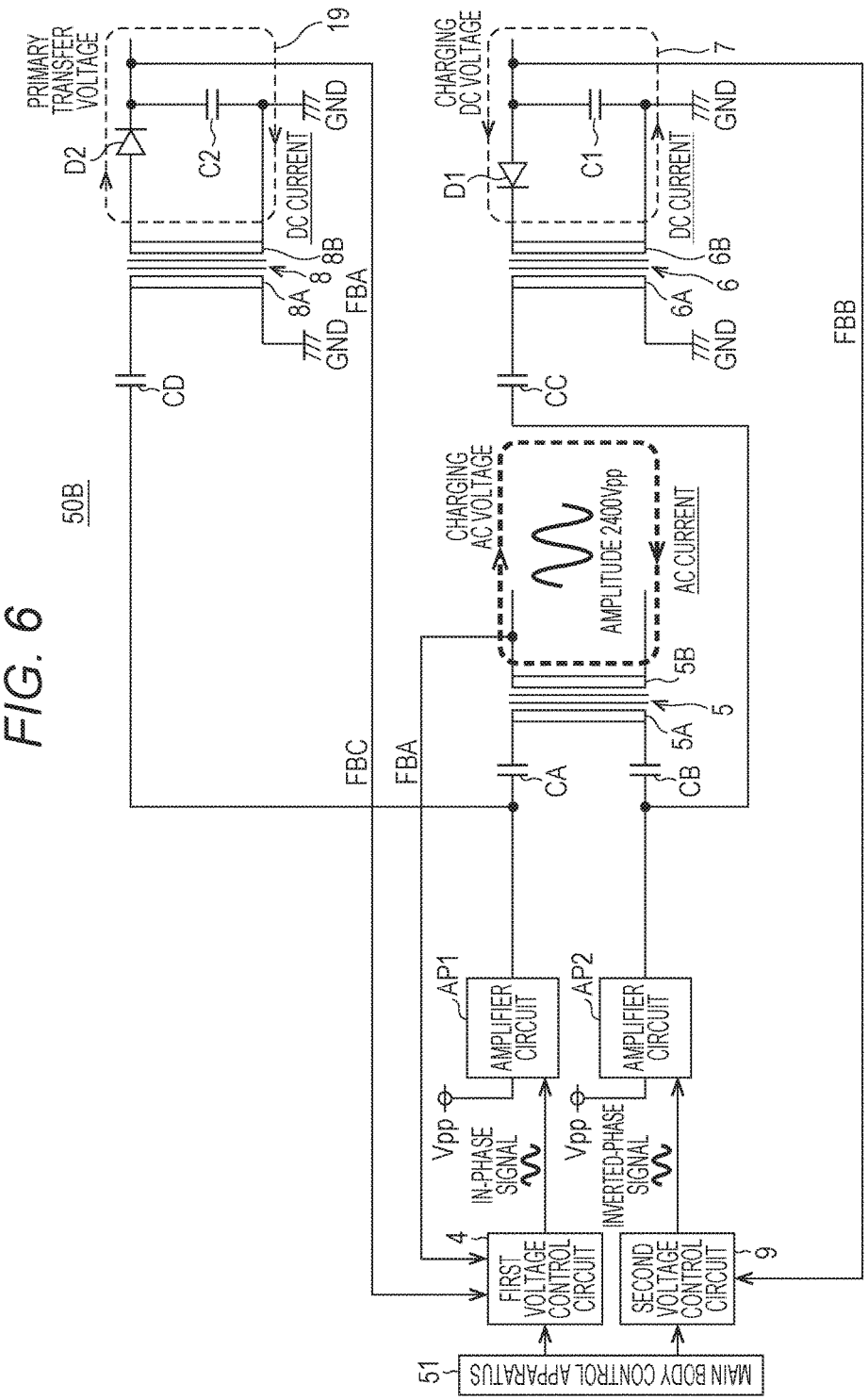
FIG. 6 is a diagram illustrating a power supply apparatus according to a second example of the embodiment.

FIG. 6 is a diagram illustrating a power supply apparatus 50B according to a second example of the embodiment.

The power supply apparatus 50B is different from the power supply apparatus 50A in that a capacitor CD, a high-voltage transformer 8, and a rectifier circuit 19 are further provided.

The high-voltage transformer 8 includes a primary winding 8A and a secondary winding 8B.

The rectifier circuit 19 includes a diode D2 and a capacitor C2.

The present example includes a capacitor CD connected in parallel to the capacitor CA.

One end side of the capacitor CD is connected to the output of the amplifier circuit AP1, while the other end side is connected to one end side of the primary winding 8A of the high-voltage transformer 8. The other end side of the primary winding 8A of the high-voltage transformer 8 is connected to the ground voltage GND.

One end side of the secondary winding 8B of the high-voltage transformer 8 is connected to the diode D2 on the anode side. The cathode side of the diode D2 is connected to the other end side of the secondary winding 8B of the high-voltage transformer 8. The other end side of the secondary winding 8B is connected to the ground voltage GND. With this configuration, application of an AC current to the primary winding 8A generates an AC voltage in the secondary winding 8B by mutual induction. The AC voltage generated in the secondary winding 8B is supplied to the primary transfer roller 31 as a primary transfer voltage by the rectifier circuit 19.

The primary transfer voltage is input as a feedback voltage FBC to the first voltage control circuit 4, and the first voltage control circuit 4 adjusts the voltage in accordance with the feedback voltage FBC.

While the power supply apparatus 50B based on the BTL system of the present example needs a control circuit and a driving element for each of the amplifier circuit AP1 that outputs the in-phase signal and the amplifier circuit AP2 that outputs the inverted-phase signal, the power supply apparatus 50B outputs the charging DC voltage using the amplifier circuit AP2 used in common for generating the charging AC voltage and outputting the inverted-phase signal. The power supply apparatus 50B outputs a primary transfer voltage using the amplifier circuit AP1 in common.

Figure 7:
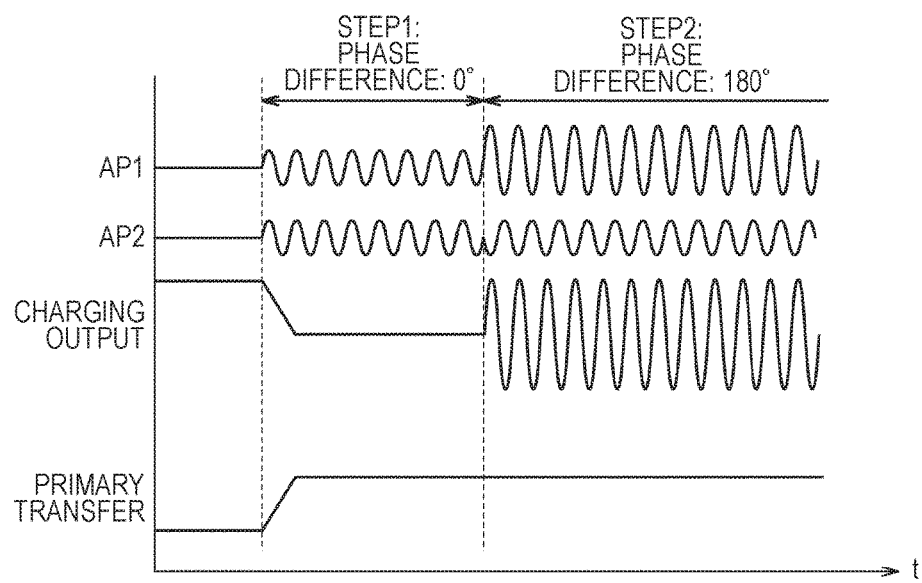
FIG. 7 is a diagram illustrating voltage generation in the power supply apparatus according to the second example of the embodiment.

FIG. 7 is a diagram illustrating voltage generation of the power supply apparatus 50B according to the second example of the embodiment.

As illustrated in FIG. 7, when the sine wave SB of an inverted-phase signal is applied from the amplifier circuit AP2, an AC current is supplied to the primary windings 5A and 6A sides of the high-voltage transformer 5 and the high-voltage transformer 6, respectively.

When the AC current is supplied to the primary winding 6A of the high-voltage transformer 6, a high voltage corresponding to the boosting ratio determined by the amplitude of the sine wave SB and by the winding ratio of the primary winding 6A and the secondary winding 6B of the high-voltage transformer 6 is generated in the secondary winding 6B of the high-voltage transformer 6 by mutual induction. The generated high voltage is rectified by the rectifier circuit 7, leading to an output of a desired charging DC voltage. In the present example, the charging DC voltage is set to a negative voltage.

Moreover, when the sine wave SA of an in-phase signal is applied from the amplifier circuit AP1, an AC current is supplied to the primary windings 5A and 8A sides of the high-voltage transformer S and the high-voltage transformer 8, respectively.

When the AC current is supplied to the primary winding 8A of the high-voltage transformer 8, a high voltage corresponding to the boosting ratio determined by the amplitude of the sine wave SA and by the winding ratio of the primary winding 8A and the secondary winding 8B of the high-voltage transformer 8 is generated in the secondary winding 8B of the high-voltage transformer 8 by mutual induction. The generated high voltage is rectified by the rectifier circuit 19, leading to an output of a desired primary transfer voltage. In the present example, the primary transfer voltage is set to a positive voltage.

In a case where the charging AC voltage is not output in the present example, the amplifier circuit AP2 applies a sine wave SB to the primary winding 5A of the high-voltage transformer 5, while the amplifier circuit API applies thereto a sine wave SA having the same phase and the same amplitude as the sine wave SB. This results in no generation of a potential difference in the primary winding 5A of the high-voltage transformer 5, leading to no generation of the charging AC voltage.

In another case where the charging AC voltage is output, the sine wave SA is applied from the amplifier circuit AP1 to one end side of the primary winding 5A of the high-voltage transformer 5. In addition, the sine wave SB is applied from the amplifier circuit AP2 to the other end side of the primary, winding 5A of the high-voltage transformer 5. Application of the sine wave SB shifted in phase by 180° with respect to the sine wave SA generates a potential difference in the primary winding 5A of the high-voltage transformer 5, leading to generation of a high voltage according to the boosting ratio determined by the winding ratio between the primary side and the secondary side of the high-voltage transformer 5. Note that it is sufficient to have a potential difference and thus even in a case where the sine waves SA and SB have the same phase, adjustment of amplitude leads to generation of a high voltage in accordance with the boosting ratio determined by the winding ratio between the primary side and the secondary side of the high-voltage transformer 5 in accordance with a potential based on a difference in the amplitudes.

Moreover, the output level of the high voltage is adjustable by varying the amplitude of the sine wave SA of the amplifier circuit AP1.

As charging sequence processing, the charging DC voltage is output, and thereafter the charging AC voltage is output.

In a case where the phase difference between the sine wave SA and the sine wave SB is δ, when one half of the amplitude of the sine wave SA is defined as PA and one half of the amplitude of the sine wave SB is defined as PB, the potential difference generated in the high-voltage transformer 5 is set to:

$$2\times\sqrt{(PA^2+PB^2+2\times PA\times PB\times\cos(-\delta))}.$$

FIG. 8 is a diagram illustrating an exemplary voltage table used for voltage generation in the power supply apparatus 50B according to the second example of the embodiment.

As illustrated in FIG. 8, it is possible to variably set the charging DC voltage, the charging AC voltage, and the primary transfer voltage by adjusting the voltages of the sine waves SA and SB and the phase difference between the sine waves SA and SB.

More specifically, when the charging AC voltage is turned off, the sine waves SA and SB are set to have the same phase and the same amplitude.

In contrast, the charging DC voltage is set to a value corresponding to the amplitude of the sine wave SB and the boosting ratio of the high-voltage transformer 6. In the present example, as an example, the boosting ratio is set to 40 times.

Therefore, the charging DC voltage is set to −400 V, −600 V, and −800 V in accordance with the amplitude of the sine wave SB of 10 V, 15 V, and 20 V.

Meanwhile, the charging AC voltage can be set by adjusting the amplitude and the phase of the sine wave SA with respect to the sine wave SB.

The charging AC voltage is set to a value corresponding to the amplitude and the phase difference of the sine waves SA and SB, and the boosting ratio of the high-voltage transformer 5. In the present example, the boosting ratio is set to 100 times.

For example, when the amplitude of the sine wave SB is 10 V, 15 V, and 20 V, the amplitude of the sine wave SA is set to 10 V, 15 V, and 20 V. Sine waves SA and SB are set to the same phase.

In this case, since the potential difference is 0, no charging AC voltage is generated.

When the amplitude of the sine wave SB is 10 V, 15 V, and 20 V, the amplitude of the sine wave SA is set to 15 V for each. The phase between sine waves SA and SB is adjusted.

In a case where the phase difference between the sine waves SA and SB is 0°, the charging AC voltage is set to 500 V, 0 V, and 500 V.

When the phase difference between the sine waves SA and SB is 90°, the charging AC voltage is set to 1803V, 2121V, and 2500 V.

When the phase difference between the sine waves SA and SB is 180°, the charging AC voltage is set to 2500 V, 3000 V, and 3500 V.

When the amplitude of the sine wave SB is 10 V, 15 V, and 20 V, the amplitude of the sine wave SA is set to 16 V for each. The phase between sine waves SA and SB is adjusted.

When the phase difference between the sine waves SA and SB is 0°, the charging AC voltage is set to 600 V, 100 V, and 400 V.

When the phase difference between the sine waves SA and SB is 90°, the charging AC voltage is set to 1887 V, 2193 V and 2561 V.

When the phase difference between the sine waves SA and SB is 180°, the charging AC voltage is set to 2600 V, 3100 V, and 3600 V.

Meanwhile, the primary transfer voltage is set to a value corresponding to the amplitude of the sine wave SA and the boosting ratio of the high-voltage transformer 8. In the present example, the boosting ratio is set to 50 times.

Therefore, the primary transfer voltage is set to 500 V to 1000 V in accordance with the amplitude of the sine wave SA of 10 V, 15 V, and 20 V. In addition, the primary transfer voltage is set to 750 V and 800 V in accordance with the amplitude of the sine wave SA of 15 V and 16 V.

The power supply apparatus 50B outputs the charging DC voltage using the amplifier circuit AP2 used in common for generating the charging AC voltage and outputting the inverted-phase signal. Furthermore, since the primary transfer voltage is generated using the amplifier circuit AP1 in common, it is possible to generate a plurality of types of high voltages with a simple configuration.

(3. Third Example of Power Supply Apparatus)

FIG. 9 is a diagram illustrating a power supply apparatus 50C according to a third example of the embodiment.

As illustrated in FIG. 9, the power supply apparatus 50C is different from the power supply apparatus 50A in that the rectifier circuit 7 is removed.

While the above-described power supply apparatus 50A is a case of generating the charging DC voltage and the charging AC voltage, the combination of the voltages to be generated is optional, and it is allowable to generate the developing AC voltage and the charging AC voltage.

Specifically, the description is a case where the power supply apparatus 50C generates the developing AC voltage using the high-voltage transformer 5 and generates the charging AC voltage using the high-voltage transformer 6.

In this configuration, it is also possible to reduce the number of necessary amplifier circuits by using one amplifier circuit in common. The color image forming apparatus includes an output system corresponding to four colors Y, M, C, and K, making it possible to reduce the circuit scale by integrating all the systems. This further increases the cost reduction effect.

FIG. 10 is a diagram illustrating voltage generation of the power supply apparatus 50C according to the third example of the embodiment.

FIG. 10 illustrates a case where a voltage is generated for the charging apparatus 11 and the developing apparatus 13 in a printing sequence.

As an initial sequence procedure, the amplifier circuits AP1 and AP2 are turned off during a period in which both the charging AC voltage and the developing AC voltage are set to off (0). Therefore, in this case, no sine waves SA and SB are output.

Next, the amplifier circuit AP2 outputs a sine wave SB at a timing of turning on the charging AC voltage immediately after the start of printing. The second voltage control circuit 9 controls the amplitude of the sine wave SB to control the charging AC voltage to be a desired voltage.

At that time, the amplifier circuit AP1 outputs a sine wave SA having the same amplitude and phase as the sine wave SB.

The amplifier circuit AP1 outputs the sine wave SA having the inverted phase and the same amplitude to the amplifier circuit AP2 to control so as not to allow the potential difference to be generated in the high-voltage transformer 5. As a result, the developing AC voltage continues to be off (0).

Thereafter, the first voltage control circuit 4 adjusts the in-phase signal at the timing of turning on the developing AC voltage. The first voltage control circuit 4 controls the amplitude or phase of the sine wave SA so as to set the developing AC voltage to be a desired voltage.

Thereafter, the developing AC voltage and the charging AC voltage can be individually controlled by controlling the timing of turning off the developing AC voltage and the timing of turning off the charging AC voltage immediately before the end of printing in accordance with the same method as described above.

(4. Fourth Example of Power Supply Apparatus)

Figure 11:
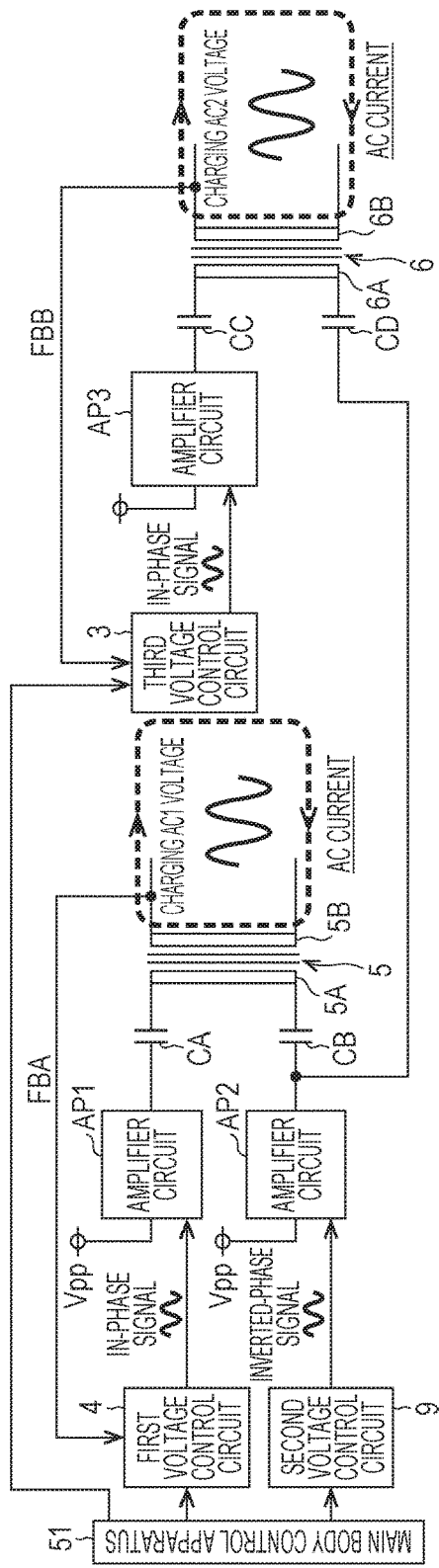
FIG. 11 is a diagram illustrating a power supply apparatus according to a fourth example of the embodiment.

FIG. 11 is a diagram illustrating a power supply apparatus 50D according to a fourth example of the embodiment.

As illustrated in FIG. 11, the power supply apparatus 50D is different from the power supply apparatus 50A in that the rectifier circuit 7 is removed. Another difference is that a third voltage control circuit 3, an amplifier circuit AP3, and the capacitor CD are further provided.

The present example is a case where a plurality of BTL system amplifier circuits are provided.

The third voltage control circuit 3 outputs an in-phase signal according to an instruction from the main body control apparatus 51.

The amplifier circuit AP3 amplifies the in-phase signal from the third voltage control circuit 3 to output a sine wave SC.

The capacitor CC has one end side connected to the output of the amplifier circuit AP3, while the other end side connected to one end side of the primary winding 6A of the high-voltage transformer 6.

The capacitor CD has one end side connected to the output of the amplifier circuit AP2, while the other end side connected to the other end side of the primary winding 6A of the high-voltage transformer 6.

A charging AC2 voltage is input as a feedback voltage FBB to the third voltage control circuit 3. The third voltage control circuit 3 adjusts the voltage in accordance with the feedback voltage FBB.

Since the other configurations are similar, detailed description thereof will not be repeated.

The main body control apparatus 51 instructs the second voltage control circuit 9 to cause the second voltage control circuit 9 to output the sine wave SB.

Moreover, the main body control apparatus 51 instructs the first voltage control circuit 4 and the third voltage control circuit 3 to cause the first voltage control circuit 4 and the third voltage control circuit 3 to output the sine waves SA and SC, respectively. In an initial state, the first voltage control circuit 4 and the third voltage control circuit 3 respectively output the sine waves SA and SC having the same amplitude and phase as the sine wave SB.

Therefore, in this case, since there is no potential difference, no charging AC voltage is generated.

By shifting the phase between the sine wave SB and the sine waves SA and SC at the timing of generating the charging AC voltage or by adjusting the amplitude, it is possible to generate a desired charging AC voltage.

The main body control apparatus 51 is capable of individually adjusting the sine wave SA output from the first voltage control circuit 4 and the sine wave SC output from the third voltage control circuit 3, making it possible to perform separate control at each of the timings of outputting the charging AC voltage.

In this configuration, it is also possible to reduce the number of necessary amplifier circuits by using one amplifier circuit in common. The color image forming apparatus includes an output system corresponding to four colors Y, M, C, and K, making it possible to reduce the circuit scale by integrating all the systems. This further increases the cost reduction effect.

While the present embodiment describes an exemplary configuration for generating a plurality of types of charging AC voltages, the description applies to the cases of generating the charging DC voltage, the developing AC voltage, and the developing DC voltage in a similar manner. Moreover, it is allowable to combine voltages to be generated in any manner and it is allowable to generate a voltage by combining the primary transfer voltage, the secondary transfer voltage, the separation voltage, the destaticizing voltage, or the like.

While the present example is a case where the power supply apparatus is mainly used for the image forming apparatus, it is possible to apply the method in general for other purposes other than the image forming apparatus.

Although embodiments of the present invention have been described and illustrated in detail, the disclosed embodiments are made for purposes of illustration and example only and not limitation. The scope of the present invention should be interpreted by terms of the appended claims. The scope of the present invention is intended to include all modifications within the meaning and scope, which are equivalent to the scope of claims.

What is claimed is:

1. A power supply apparatus comprising:
   a first primary winding;
   a first AC voltage outputter connected to one side of the first primary winding so as to output a first AC voltage;

a second AC voltage outputter connected to the other side of the first primary winding and capable of outputting a second AC voltage with an inverted phase of the first AC voltage;

a first secondary winding that generates a third AC voltage by mutual induction of the first primary winding to which the first AC voltage and the second AC voltage are applied;

a second primary winding having one side receiving an input of the second AC voltage and the other side connected to a fixed voltage; and a second secondary winding that generates a fourth AC voltage by mutual induction of the second primary winding to which the second AC voltage is applied.

2. The power supply apparatus according to claim 1, further comprising a first converter that converts the fourth AC voltage into a DC voltage.

3. The power supply apparatus according to claim 2, further comprising:

a third primary winding having one side receiving an input of the first AC voltage and the other side connected to the fixed voltage; and a third secondary winding that generates a fifth AC voltage by mutual induction of the third primary winding to which the first AC voltage is applied.

4. The power supply apparatus according to claim 3, further comprising a second converter that converts the fifth AC voltage into a DC voltage.

5. The power supply apparatus according to claim 1, wherein the second AC voltage outputter outputs a second AC voltage having the same phase as the first AC voltage in a first period, and outputs a second AC voltage having an inverted phase of the first AC voltage in a second period different from the first period.

6. An image forming apparatus comprising the power supply apparatus according to claim 1, wherein the third and fourth AC voltages are used for any of voltages as charging processing voltage, separation processing voltage, development processing voltage, and destaticizing processing voltage.

* * * * *